United States Patent [19]

Johnson

[11] Patent Number: 4,765,950

[45] Date of Patent: Aug. 23, 1988

[54] PROCESS FOR FABRICATING PARTS FROM PARTICULATE MATERIAL

[75] Inventor: Kenneth P. Johnson, Diamond Bar, Calif.

[73] Assignee: Risi Industries, Inc., Chula Vista, Calif.

[21] Appl. No.: 105,246

[22] Filed: Oct. 7, 1987

[51] Int. Cl.$^4$ .............................................. B22F 1/00
[52] U.S. Cl. ........................................ 419/2; 264/63; 264/66; 264/125; 419/36; 419/37; 419/54
[58] Field of Search .................... 419/2, 36, 37, 54; 264/66, 125, 63

[56] References Cited

U.S. PATENT DOCUMENTS

| | | | |
|---|---|---|---|
| 3,926,671 | 12/1975 | Gutjahr et al. | 419/37 |
| 3,933,652 | 1/1976 | Weichselbaum et al. | 419/36 |
| 4,225,345 | 9/1980 | Adee et al. | 419/36 |
| 4,483,905 | 11/1984 | Engstrom | 419/36 |
| 4,569,821 | 2/1986 | Dupernay et al. | 419/36 |
| 4,604,259 | 8/1986 | Whitman | 419/36 |
| 4,664,883 | 5/1987 | Melody et al. | 419/37 |

*Primary Examiner*—Stephen J. Lechert, Jr.
*Attorney, Agent, or Firm*—Burns, Doane, Swecker & Mathis

[57] ABSTRACT

Provided is a method of manufacturing sintered parts from particulate material, e.g metal or ceramic parts. The method comprises mixing together predetermined amounts of powdered particulate material and a binder, which mixture is then molded under heat and pressure. The binder comprises at least a lower melting point component and a higher melting point component, with the lower melting point component remaining in a liquid state, becoming semi-solid or relatively soft upon cooling to ambient temperatures. Prior to sintering, the lower melting point component of the binder is selectively dissolved in a liquid solvent, and the higher melting point component is removed upon heating at temperatures below the sintering temperature. The result is a process which eliminates or prevents the formation of oxides, substantially reduces the time required for debinding and sintering, and essentially eliminates cracking in the finished part.

24 Claims, No Drawings

PROCESS FOR FABRICATING PARTS FROM PARTICULATE MATERIAL

BACKGROUND OF THE INVENTION

1. Field of the Invention

This invention generally relates to a mixture of two or more binder materials and the preparation therefrom of green bodies formed from the mixture of such binder materials and a particulate material, such as powdered metals. More particularly, it relates to a binder mixture of components which consolidate at different temperatures so as to enable the formed green body or compact to have one or more of the binder components removed by chemical leaching, rendering the part porous yet structurally stable. The remaining component of the binder system can be removed at a temperature below the final sintering temperature, the part retaining its shape after all binder elements have been removed, thereby leaving only the particulate material so sintering can be completed. Moreover, the foregoing steps are completed under conditions which eliminate or prevent the formation of oxides, thereby substantially reducing the time required for debinding, for removing the remaining thermoplastic portion of the binder under pre-sintering conditions, and due to the absence of oxide formation, for conducting the final sintering cycle. The process also eliminates cracking in the part.

2. Description of the Prior Art

The processes of the prior art for fabricating parts from particulate material have for the most part produced satisfactory products, but they are characterized by slow production rates. Also, they have the disadvantage of being restricted in their choice of, e.g., metal alloys suitable for use in the process because of oxidation of the fabricated part during the course of processing. This oxidation occurs during the debinding step in one widely practiced technique, or it can occur during the feedstock mixing step in another process technique currently being practiced. Further, the known prior processes are slow and/or require expensive special-purpose equipment.

Conventional practice in metal injection molding is that the binders in the feedstock serves two basic functions, that is (1) in liquid form it acts as the carrier in the metal powder/binder slurry which makes it possible to fill the mold cavity uniformly at moderate pressure, and (2) in solid form the binder holds the metal powders together in the desired shape after molding and before sintering. To facilitate sintering, the compact is made porous by removing a portion of the binder prior to sintering. This requires that the binder be made up of at least two components. The first component of the binder remains in the compact to hold the compact together as it is introduced into the sintering furnace, and the second principal component of the binder is stripped from the part to make it porous by thermal or selective leaching means prior to sintering. The first component of the binder which remains in the part must have a high melting or charring temperature in order to bring the metal powders to a pre-sintered condition, as this component of the binder leaves the part in the sintering furnace.

Among the two component feedstock binder systems which are known, e.g., see Adee et al, U.S. Pat. No. 4,225,345, one is a system utilizing a combination of (i) plastics, such as polypropylene, polyethylene, and mixtures thereof, combined with (ii) waxes, such as paraffin, beeswax, carnauba and mixtures thereof. The waxes are the strippable component of the binder, and the plastics are the last component to leave the compact in the sintering furnace. The plastics in general have a melting point ranging above 300° F., and the waxes having melting points ranging from 125° to 200° F.

As a green part is formed in the mold, the part is cooled and the first binder component to solidify, forming a matrix, is the plastic, with the second component to solidify being the wax. In the case of paraffin wax, as it changes phase from liquid to solid, a volumetric shrinkage ranging from 17 to 20 percent occurs. This abrupt shrinkage of the wax component in the already formed plastic matrix of the binder leads to cracking in the green part. This is particularly evident in parts of nonuniform cross-sections where the cooling rate through the part is inherently uneven.

Hermi et al, U.S. Pat. No. 4,283,360, discloses a process for producing molded ceramic or metal parts wherein the binder system is a mixture of resins. One resin is a solvent soluble resin which is removed by dissolution in a solvent, and the other resin is an insoluble resin which is removed by a firing process. Both components of the binder are, therefore, solids. One of the problems of the process, however, is that the debinding process is extremely long in that the dissolution step can be on the order of 50 to about 100 hours. Shorter processing times would be most desirable.

Three additional patents in the prior art of particular interest with regard to binder removal are U.S. Pat. Nos. 4,197,118, and 4,404,166, each to Weitch, and 4,113,480 to Rivers.

The Weitch '118 patent relates to a procedure for the removal of binder to render the green compact porous, and proposes that it be accomplished by thermal evaporation or solvent extraction. However, both of the Weitch techniques for debinding green parts are slow and unduly expensive.

Thermal evaporation, if carried out in a stream of heated air, produces a brittle, heavily oxidized compact. This is the most common state-of-the-art method presently employed. For example, when processing nickel-/iron alloys, debinding in air takes greater than two (2) days. A great volume of pre-heated air is also required in the thermal evaporation process, which is a costly and inefficient use of energy. The heavily oxidized compacts produced by thermal evaporation also require a long oxide reduction step in a reducing atmosphere before the sintering cycle can be initiated in the furnace, requiring a total cycle time of 2 to 3 days. Further, metals or alloys which form stable oxides cannot be processed by this technique.

The solvent extraction technique disclosed by Weitch requires that the green compact be pre-heated in the absence of solvent prior to introducing the solvent in vapor form. It is well known in industrial practice that vapor degreasing is most effective when cold parts are introduced into the vapor of a solvent because the clean solvent then condenses on the surface of the cold part, and cleaning action is vigorous. The condensing rate, and subsequent cleaning action, is diminished as the part heats up to the temperature of the condensing solvent. Weitch has applied this well-known principal to avoid damage to green compacts by pre-heating the compact, thus slowing the cleaning rate. The result is an extended debinding time and a process requiring special equipment. The quantity of solvent and time required for solvent extraction as described in the Weitch patent is impractical. This is evident from the present predominant use of thermal evaporation by the industry.

The Rivers' process utilizes a fluid mixture of water, methyl cellulose, glycerine and boric acid, as the carrier mixed with metal powders at room temperature to form a moldable slurry. The green compact is formed in a mold by elevating the temperature of the slurry in the mold which causes the methyl cellulose to reject water and form a gel. It has been found that active powders, such as reduced iron, will react with the oxygen in the water to produce iron oxide and generate an exothermic reaction. This causes the mixture to heat and set up prior to molding and limits this process to less active, or pre-alloyed metal powders.

Accordingly, it is an object of the present invention to provide a novel process for fabricating parts from particulate material which overcomes the aforedescribed deficiencies of the prior art, and especially eliminates cracking in the part.

It is another object of the present invention to provide such a process which also eliminates or prevents the formation of oxides.

Still another object of the present invention is to provide such a process which substantially reduces the time required for debinding.

These and other objects, as well as the scope, nature and utilization of the invention, will be apparent to those skilled in the art from the following description and the appended claims.

SUMMARY OF THE INVENTION

In general, the present invention provides a method of manufacturing sintered parts from particulate material comprising the steps of:

(i) mixing together predetermined amounts of powdered particulate material and a binder to produce a liquid slurry mixture, said binder being comprised of at least two components having differing melting points, at least a lower melting point component and a higher melting point component, with the lower melting point component remaining in a liquid state, becoming semi-solid or relatively soft upon cooling to ambient temperatures;

(ii) molding the mixture of particulate material and binder into a part of desired shape by injecting said mixture under heat and pressure into a mold, and allowing said mixture to solidify;

(iii) removing the lower melting point component of the binder by use of a liquid solvent which selectively dissolves the lower melting point component and leaves at least the higher melting point component of the binder undissolved, thereby rendering said part porous and free of cracks;

(iv) removing the higher melting point component of the binder by heating at a temperature below the final sintering temperature to thereby provide a part which is essentially free of binder; and (v) subjecting the binder-free part to a final sintering temperature in order to complete the sintering of the part.

In a preferred embodiment, the particulate material is a powdered metal such as a nickel/iron alloy. Moreover, it is preferred that the lower melting point component of the binder comprises an oil such as a vegetable oil.

DETAILED DESCRIPTION OF THE PREFERRED EMBODIMENTS

In general, in fabricating parts from powdered particulate material by an injection molding process in accordance with the present invention, metal or ceramic powders are blended with a mixture of liquid thermoplastic carriers or binders at an elevated temperature to form a slurry, with the mixture being allowed to harden by reducing its temperature to ambient conditions. It is then granulated to produce a feedstock. The feedstock is then remelted in the feed barrel of an injection molding machine and injected into a chilled mold under moderate pressure to form a green compact of desired shape. The green compact sets up in the chilled mold by cooling the thermoplastic binder or portions thereof below its melting point. A major portion of the binder is then removed in a manner to render the green compact porous without disturbing the shape thereof. The porous green compact is then sintered to produce a metal part. During the overall sintering process, the green compact is held at an intermediate temperature to remove residual binder by evaporation, or burn out, prior to elevating the furnace to the final sintering temperature.

A major problem which has been encountered in fabricating metal parts by the metal injection molding process of the prior art is that cracks often occur in the molded green compacts, which cracks carry over to finished parts, even though they generally originate in the molding step and are due to the set-up characteristics of the mixtures or feedstock used to mold the green parts. An important advantage of the process of the present invention is that such disadvantages can be eliminated. This advantage is realized through the use of the binder system of the present invention.

The binder system of the present invention comprises at least a lower melting point component and a higher melting point component, with the lower melting point component remaining in a liquid state, or becoming semi-solid or relatively soft upon cooling at ambient temperatures. The lower melting point component is removed by use of a liquid solvent, and the higher melting point component is removed upon heating at temperatures below the final sintering temperature of the sintering cycle. It is preferred that the higher melting point component of the binder has a melting point about 150° F. greater than that of the lower melting point component, with the higher melting point component having a melting point in the range of about 300° F. to about 400° F., and the lower melting point component having a melting point in the range of about ambient to about 175° F. It is important to note that while the foregoing temperature ranges have been found to be most practical, the invention is not to be narrowly confined thereto, as it is the characteristics of the binder components and their relationships to each other as described hereinafter that is most important in selecting appropriate binder components.

These two major components of the binder must be chemically compatible, miscible at liquid conditions and, in order to minimize cracking in the molding step, they must have shrinkage characteristics which are compatible.

It has been found that in order to make the shrinkage of the lower melting point component of the binder compatible with the higher melting point component, lower melting point components are selected which do not put a strain on the matrix of the higher temperature component. This is accomplished by using materials which either flow by remaining in a liquid state, become semi-solid, or are relatively soft after they have been cooled to ambient temperature. Such materials exhibit minimal volumetric change, and therefore have shrinkage characteristics compatible with the higher melting point component of the binder.

A suitable material for the purposes of the present invention which remains liquid as it cools to ambient temperature is vegetable oil, which remains liquid as it contracts due to cooling, and thus flows into the plastic matrix of the binder.

A material which cools to become semi-solid at ambient temperature is a mixture of vegetable oil and wax, which combination is effective as a lower melting point component of the binder. Among the suitable waxes employable are paraffin wax and carnauba wax. Whenever a mixture of oil and wax is employed as the lower melting point component, it is preferred that the mixture has a weight ratio of oil to wax in the range of from about 99/1 to about 50/50.

Hydrogenated vegetable oil, which is relatively soft after it cools to ambient temperature, is another useful material when employed alone, or in combination with a wax such as paraffin wax, as the lower melting point component of the binder. This material exhibits minimal shrinkage during its transition from the liquid to solid states.

It is preferred that the higher melting point material is a plastic material, with such materials as polyethylene and polypropylene being most preferred. Other suitable plastic materials can be used, however, in the present invention.

It has been demonstrated that the application of these principles utilizing the above materials, or other materials of similar properties, will substantially reduce or eliminate the cracking phenomenon commonly observed in the molding processes of the prior art.

The method of this invention, in addition to using a special mixture of binders, involves a particular manner for the removal of a major portion of the binder by chemical leaching to produce a porous compact, and a procedure for pre-sintering the compact to remove the residual thermoplastic binder prior to elevating the temperature of the compact so as to complete the sintering thereof in order to produce a net shaped metal part, all under conditions which prevent the formation of oxides.

Thus, this invention provides a method for rapidly debinding molded green compacts without resultant damage or oxidation of the green compact while permitting the sintering of such compacts in conventional furnaces. Such a process thus broadens the selection of metals and alloys which can be utilized to fabricate parts. Further, it enables the debinding time in the process to be reduced from 2 days to 1 to 6 hours, and reduces the sintering time from 3 days to 8 hours or less.

It has been observed that green molded compacts, when selectively leached in boiling solvents or conventional industrial vapor degreasers, exhibit damage from the vigorous action of the solvent. Damage to the green compact is eliminated, however, when the part is allowed to soak in liquid solvent at a temperature 10° F. to 20° F. below the boiling point of the solvent, and can be carried out at ambient temperatures. Useful as a solvent in this respect is methylene chloride, which has a boiling point temperature of 105° F. Methylene chloride is therefore a preferred solvent in accordance with this invention. Other solvents with low boiling points which can also be used in the process are acetone and naphtha.

The binder in green molded compacts of the present invention can be selectively leached by solvent extraction, e.g., by immersion, in most conventional liquid solvents maintained below their boiling points. In order to accelerate this leaching step, the lower melting point component of the binder most preferably has a melting point above and close to the boiling point of the solvent. In other words, it is preferred that the liquid solvent be maintained at a temperature below the melting points of the binder components.

The solvent debinding equipment required is very simple and is not elaborate or expensive in that all that is generally required, e.g., is a suitable immersion tank, and optionally a still to recondition or recover the solvent.

Many green compacts of different configurations and wall thicknesses, e.g., ranging from 0.020 inches to 0.5 inches, have been selectively leached by this technique and subsequently sintered. Leaching time, which is a function of part thickness, has ranged from one-half hour to six hours, as compared to the prior art methods requiring from two to several days.

The above-described selective leaching step does not add oxygen to the part and thus the leached compacts are free of objectionable oxides.

The sintering cycle of the present method may be carried out in conventional vacuum sintering furnaces over a period of time in the furnace ranging from 6 to 8 hours with no need for an oxide reducing atmosphere. Eliminating the requirement for oxide reduction thus enables a variety of sintering methods, including vacuum sintering, to be used and a broader choice of metal alloys to be processed. For example, the carbon level in nickel/iron alloys produced to date using vacuum sintering has been 0.45%, which is acceptable in a medium carbon steel. However, with oxide-free compacts, carbon levels can be controlled, if desired, using well-established sintering techniques by employing endothermic or exothermic atmospheres in the sintering furnaces, thus allowing a wide choice of metal alloys and sintering processes.

More particularly, an exemplary sintering cycle of the present invention involves raising the temperature in the furnace to about 750° F. and then holding while outgassing takes place. The temperature is then raised several hundred degrees, e.g., to about 950° F., and held for outgassing. The temperature of the furnace is then again raised several hundred degrees, e.g., to about 1250°0 F., and held for degassing. Arrival to the final sintering temperature is then completed, e.g., a temperature of about 2300° F., with completion of the sintering taking place in order to form the final product. In the process of the present invention, the higher melting point component of the binder, and whatever residual lower melting point component remains after the chemical leaching step, is completely removed prior to achieving the final sintering temperature. Thus, the part subjected to the final sintering temperature is substantially binder-free. Modification in the specific aforedescribed temperatures and time periods can of course be effected by the skilled artisan, and are contemplated as being within the scope of the present invention.

In order to further illustrate the present invention, illustrative examples are described hereinafter which demonstrate the principles of rapid solvent removal of one or more components of the binder mixture without forming metal oxides, and the control of cracking in molded parts by proper selection of the properties of the binder mixture components.

COMPARATIVE EXAMPLE

The combination of metal powders and binder materials shown in Table 1 were mixed thoroughly in a high shear mixer at a temperature of 350° F. for thirty minutes.

TABLE 1

|  | % WGT |
| --- | --- |
| 8% Nickel/Iron (−325 Mesh) = | 92.35 |
| Paraffin Wax (126° F. Melting point) = | 5.74 |
| Polyethylene = | 1.60 |
| Polypropylene = | 0.31 |

Test pieces 0.376 inches in diameter and 3.0 inches long were molded. These test pieces were selectively leached in methylene chloride for four hours and sintered at a temperature of 2300° F. Total time in the vacuum furnace was eight hours, including one hour at 2300° F.

More specifically, the temperature of the furnace was initially raised to 750° F. over a period of time of about 30 minutes, and held at that temperature for about 30 minutes to permit outgassing. Over the next 20 minutes, the temperature of the furnace was raised to about 950° F., and held for about 20 minutes while outgassing occurred. Over the next five minutes, the temperature was raised to about 1250° F. and held for about 15 minutes to permit outgassing. Finally, the temperature of the furnace was raised to about 2300° F. over a period of time of about 20 minutes, and held for one hour for completion of the sintering. The sintered part was then allowed to cool to yield the final shaped part.

Weight loss after the selective leaching was about 5.28%, which indicates that 92% of the wax was removed in the debinding step. Part density after sintering was typically 7.56 gr/cc, which is 96% of wrought density for this alloy.

It was noted in the comparative example, that the test pieces exhibited cracks after they had been molded. This cracking is caused by the high shrinkage of the unmodified wax component of the binder. In the following examples, however, this cracking has been eliminated by using lower melting point binder components which either remain liquid or become semi-solid as they cool, in accordance with the present invention.

EXAMPLE ONE

The combination of metal powders and binder materials shown in Table 2 were mixed and processed in the same manner as in the Comparative Example.

TABLE 2

|  | % WGT |
| --- | --- |
| 8% Nickel/Iron (−325 Mesh) = | 91.17 |
| Polypropylene = | 2.21 |
| Peanut Oil = | 6.62 |

Weight loss after selective leaching was typically 6.5%, which indicates that 98% of the oil had been removed in the solvent debinding step. Part density after sintering was 7.52 gr/cc. These samples were all free of cracks after molding.

EXAMPLE TWO

The combination of metal powders and binder material shown in Table 3 were mixed and processed in the same manner as in the Comparative Example.

TABLE 3

|  | % WGT |
| --- | --- |
| 8% Nickel/Iron (325 Mesh) = | 91.62 |
| Polypropylene = | 2.10 |
| Paraffin Wax (126° F. Melting point) = | 2.10 |
| Peanut Oil = | 4.18 |

Weight loss after selective leaching was 6.04%, which indicates that 96% of the oil and wax had been removed. Part density after sintering was typically 7.52 gr/cc. These samples were all free of cracks after molding.

EXAMPLE THREE

The combination of metal powders and binder materials shown in Table 4 were mixed and processed in the same manner as in the Comparative Example.

TABLE 4

|  | % WGT |
| --- | --- |
| 8% Nickel/Iron (−325 Mesh) = | 91.17 |
| Polypropylene = | 2.21 |
| Hydrogenated Vegetable Oil = | 6.62 |

Weight loss after selective leaching was typically 6.45, which indicates that 97.4% of the hydrogenated oil had been removed in the debinding step. Part density after sintering was 7.54 gr/cc. These samples were also all free of cracks after molding.

Thus, the foregoing examples clearly demonstrate that through the utilization of the present invention, a unique and advantageous process can be practiced which results in a part substantially free of cracks.

Although the invention has been described with preferred embodiments, it is to be understood that variation and modification may be resorted to as will be apparent to those skilled in the art. Such variations and modifications are to be considered within the purview and the scope of the claims appended hereto.

What is claimed is:

1. A method of manufacturing sintered parts of particulate material consisting essentially of:
   (i) mixing together predetermined amounts of powdered particulate material and a binder to produce a liquid slurry mixture, said binder being comprised of at least two components having differing melting points, at least a lower melting point component and a higher melting point component, with the lower melting point component remaining in a liquid state, becoming semi-solid or relatively soft upon cooling to ambient temperature;
   (ii) molding the mixture of particulate material and binder into a part of desired shape by injecting said mixture under heat and pressure into a mold, and allowing said mixture to solidify;
   (iii) removing the lower melting point component of the binder by a liquid solvent which selectively dissolves the lower melting point component and leaves at least the higher melting point component of the binder undissolved, rendering said part porous and free of cracks;

(iv) removing the higher melting point component of the binder by heating at a temperature below the final sintering temperature to thereby provide a part which is essentially free of binder; and (v) subjecting the binder-free part to a final sintering temperature in order to complete the sintering.

2. The method of claim 1, wherein the liquid solvent is maintained at a temperature below its boiling point.

3. The method of claim 2, wherein the liquid solvent is maintained at a temperature below the melting points of the binder components.

4. The method of claim 2, wherein the liquid solvent is maintained at a temperature below the melting point of the higher melting point component of the binder, but above the melting point of the lower melting point component of the binder.

5. The method of claim 1, wherein the higher melting point component of the binder is a plastic material.

6. The method of claim 5, wherein the plastic material is polypropylene or polyethylene.

7. The method of claim 1, wherein the lower melting point component of the binder comprises an oil.

8. The method of claim 7, wherein the lower melting point component comprises a mixture of an oil and a wax.

9. The method of claim 8, wherein the oil is vegetable oil or hydrogenated vegetable oil and the wax is paraffin wax or carnauba wax.

10. The method of claim 8, wherein the oil is peanut oil.

11. The method of claim 8, wherein the mixture of oil and wax has a weight ratio of oil to wax in the range of from about 99/1 to about 50/50.

12. The method of claim 7, wherein the oil comprises vegetable oil or hydrogenated vegetable oil.

13. The method of claim 7, when the oil comprises peanut oil.

14. The method of claim 1, wherein the higher melting point component of the binder has a melting point about 150° F. greater than that of the lower melting point component.

15. The method of claim 14, wherein the higher melting point component has a melting point in the range of about 300° F. to about 400° F., and the lower melting point component has a melting point in the range of about ambient to about 175° F.

16. The method of claim 1, wherein the higher melting point component is removed by heating in the range of about 700° F. to about 1400° F.

17. The method of claim 1, wherein the part is immersed in the liquid solvent for a period of time of about 2 hours or less.

18. The method of claim 1, wherein the higher melting point component of the binder comprises polypropylene or polyethylene, and the lower melting point component of the binder comprises an oil or a mixture of an oil and a wax.

19. The method of claim 18, wherein the oil is peanut oil or a hydrogenated vegetable oil.

20. The method of claim 1, wherein the powdered particulate material is a nickel/iron alloy.

21. The method of claim 1, wherein the particulate material comprises aluminum.

22. The method of claim 1, wherein the liquid solvent is methylene chloride, acetone or naphtha.

23. A method of manufacturing sintered metal parts consisting essentially of:

(i) mixing together predetermined amounts of powdered particulate material and a binder to produce a liquid slurry mixture, said binder being comprised of at least two components having differing melting points, at least a lower melting point component and a higher melting point component, with the lower melting point component remaining in a liquid state, becoming semi-solid or relatively soft upon cooling to ambient temperatures and comprising an oil or a mixture of an oil and wax, and with the higher melting point component comprising polypropylene or polyethylene;

(ii) molding the mixture of particulate material and binder into a part of desired shape by injecting said mixture under heat and pressure into a mold, and allowing said mixture to solidify;

(iii) removing the lower melting point component of the binder by placing the part in a liquid solvent, the solvent comprising methylene chloride, acetone or naphtha, which solvent selectively dissolves the lower melting point component and leaves at least the higher melting point component of the binder undissolved, rendering said part porous and free of cracks;

(iv) removing the high melting point component of the binder by heating at a temperature in the range of from about 700° F. to about 1400° F. to thereby provide part which is essentially free of binder; and (v) subjecting the binder-free part to a final sintering temperature in order to complete the sintering.

24. The method of claim 23, wherein the particulate material comprises nickel/iron alloy.

* * * * *